(No Model.) 5 Sheets—Sheet 1.

J. H. MARTIN.
APPARATUS FOR MANUFACTURING ICE.

No. 587,840. Patented Aug. 10, 1897.

Witnesses
F. G. Fischer
G. W. Thorpe

Inventor:
J. H. Martin
By Higdon & Higdon
Attys.

(No Model.)　　　　　　J. H. MARTIN.　　　　5 Sheets—Sheet 2.
APPARATUS FOR MANUFACTURING ICE.
No. 587,840.　　　　　　　　Patented Aug. 10, 1897.
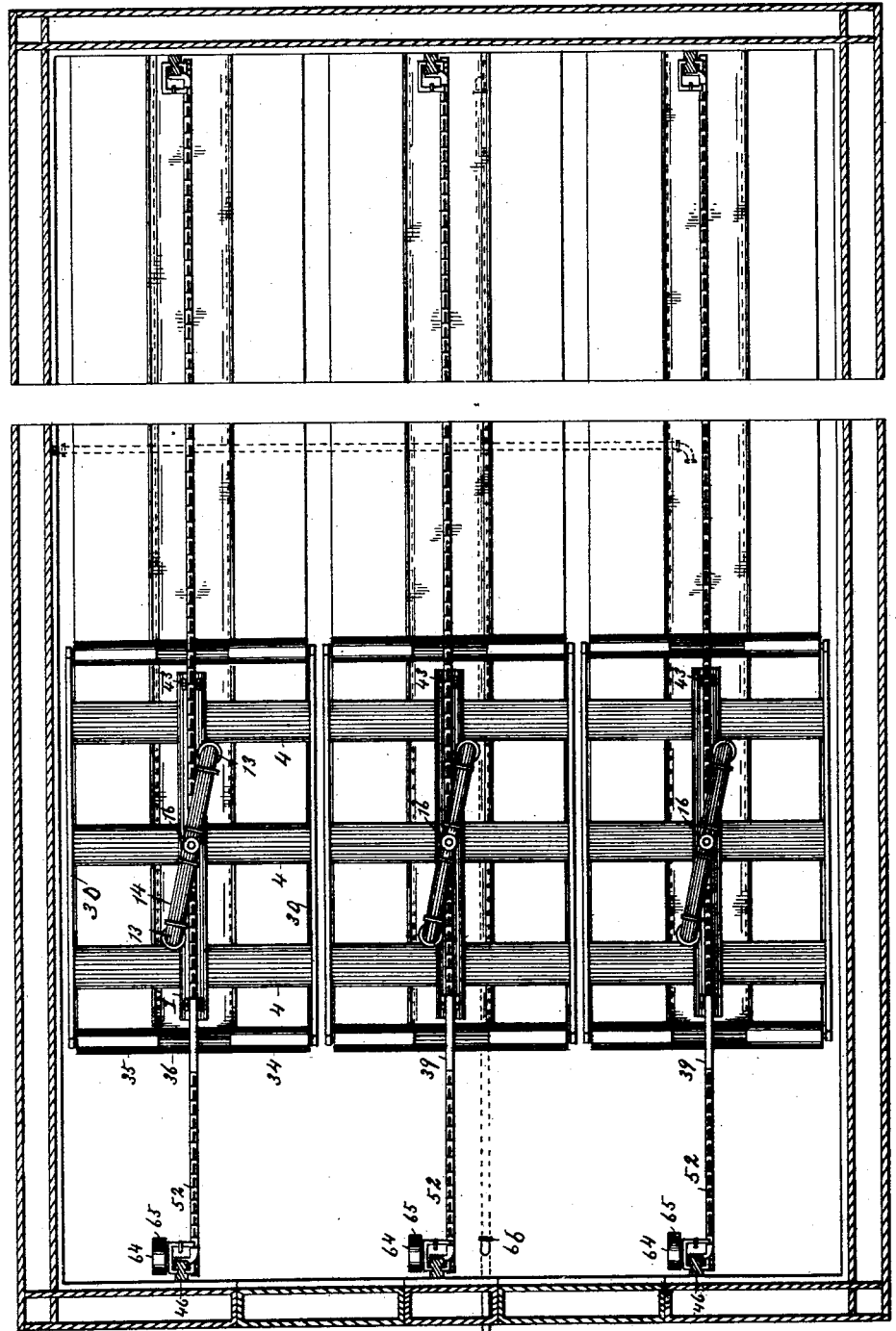
Witnesses　　　　　　　　　　　　　　Inventor:
　　　　　　　　　　　　　　　　　　　J. H. Martin

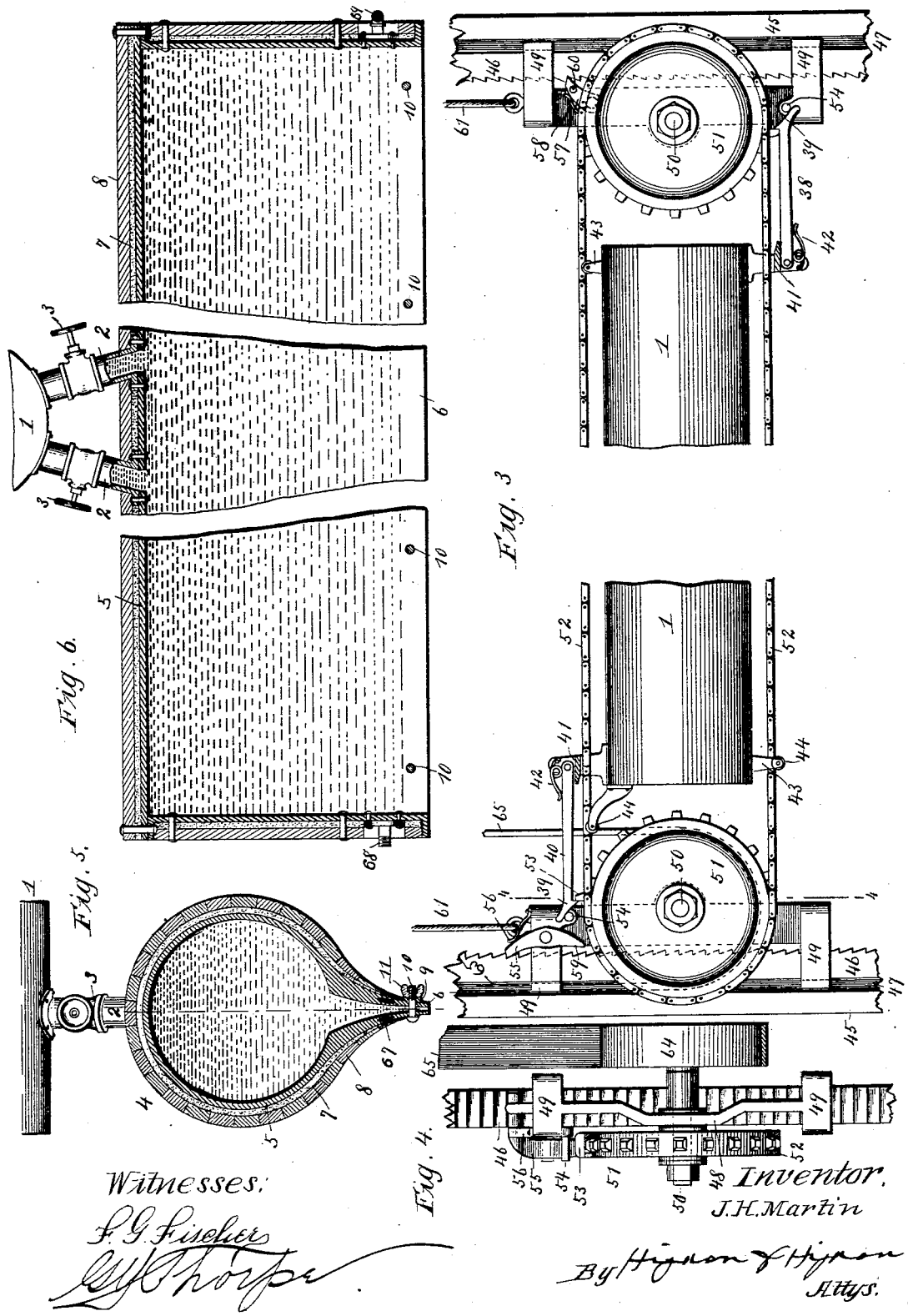

(No Model.)  5 Sheets—Sheet 4.
J. H. MARTIN.
APPARATUS FOR MANUFACTURING ICE.
No. 587,840. Patented Aug. 10, 1897.
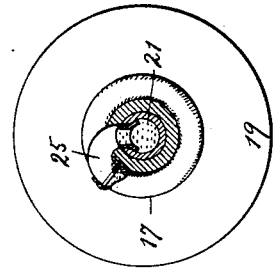
Fig. 9.
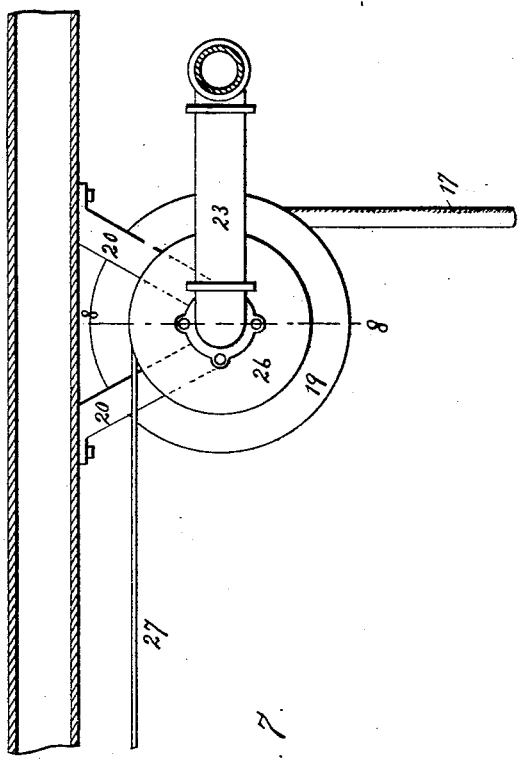
Fig. 7.
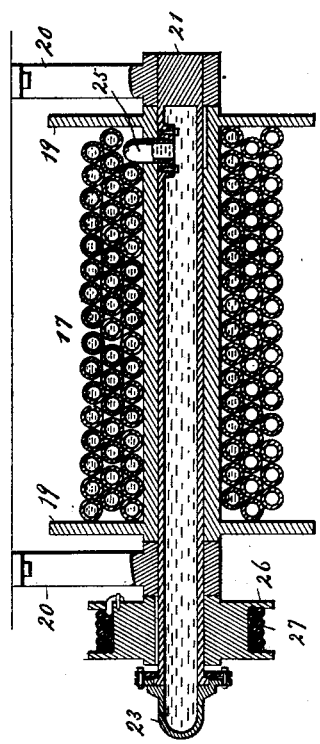
Fig. 8.
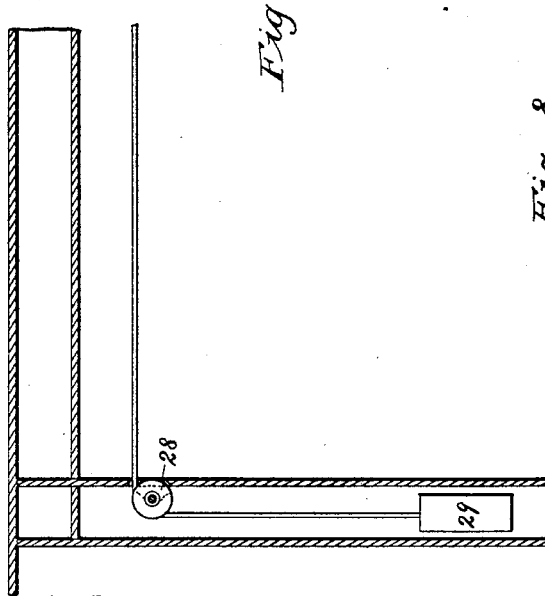
Witnesses:
F. G. Fischer
G. Y. Thorpe
Inventor:
J. H. Martin
By Higdon & Higdon
Attys.

(No Model.)

J. H. MARTIN.
APPARATUS FOR MANUFACTURING ICE.

No. 587,840. Patented Aug. 10, 1897.

Witnesses:
F. G. Fischer
G. J. Thorpe

Inventor.
J. H. Martin
By Higdon & Higdon
Attys.

UNITED STATES PATENT OFFICE.

JOHN H. MARTIN, OF KANSAS CITY, MISSOURI, ASSIGNOR OF NINE-TWENTIETHS TO JOHN W. McDANIELDS, OF BONNER SPRINGS, KANSAS.

APPARATUS FOR MANUFACTURING ICE.

SPECIFICATION forming part of Letters Patent No. 587,840, dated August 10, 1897.

Application filed August 31, 1895. Serial No. 561,170. (No model.)

*To all whom it may concern:*

Be it known that I, JOHN H. MARTIN, of Kansas City, Jackson county, Missouri, have invented certain new and useful Improvements in Methods of and Apparatus for Manufacturing Ice, of which the following is a full, clear, and exact description, reference being had to the accompanying drawings, forming a part hereof.

My invention relates to apparatus for manufacturing ice in a solid or substantially solid mass, of any required dimensions, at much less expense than at present is attached to the manufacture of this article.

The invention contemplates the employment of water-distributers of peculiar construction which shall reciprocate over a given area and shall automatically rise with its operating mechanism to accommodate the constantly-increasing altitude of the mass of ice.

It also contemplates the use of flexible hose or pipes connected permanently (while in operation) at one end to each water-distributer to keep the latter constantly supplied, and means to take up or pay out said hose automatically to accommodate the constantly-varying position of the distributers relative to the end of the hose which is supplied with water.

It furthermore consists in the employment of steam to obviate any tendency of the water toward freezing in the distributers.

The object of my invention is to produce an apparatus which shall embody all of the features above enumerated, which shall be positive and reliable in operation, and at the same time be comparatively simple and inexpensive in construction.

In order that the invention may be fully understood, I will proceed to describe it with reference to the accompanying drawings, in which—

Figure 1:
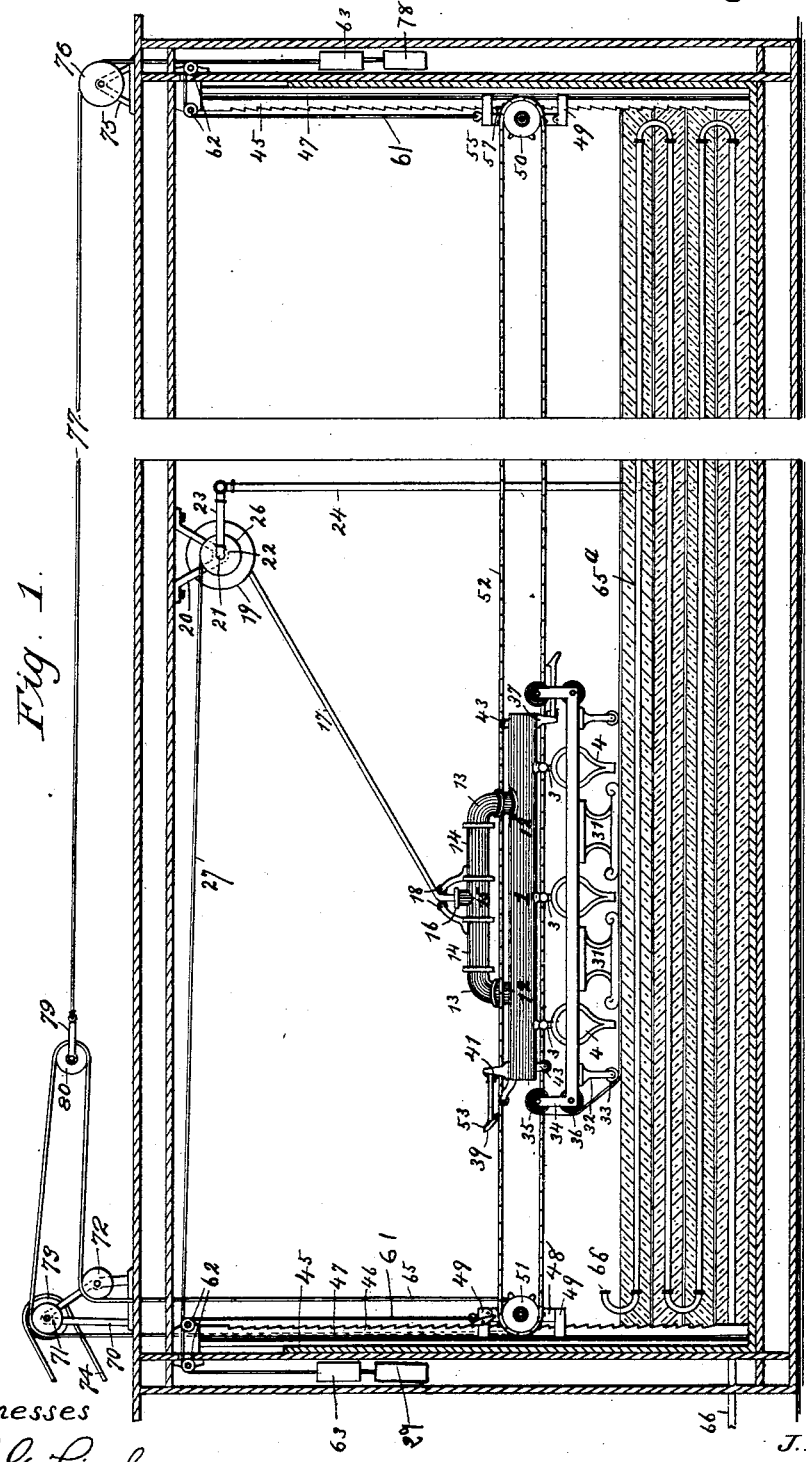
Figure 10:
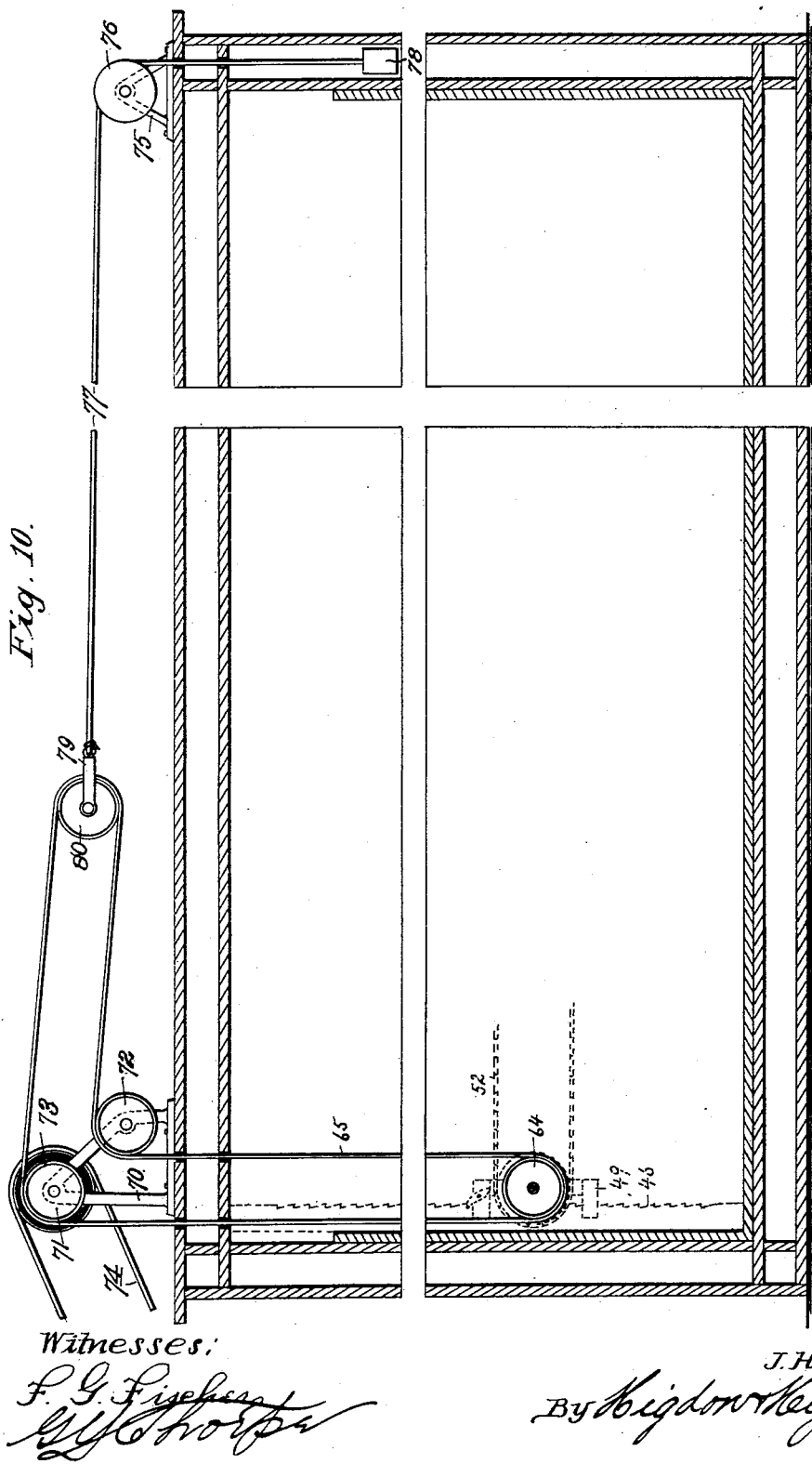

Figure 1 represents a vertical longitudinal section of an ice-house and shows therein my improved ice-making apparatus. Fig. 2 represents a horizontal section of the same, taken just above the distributers. Fig. 3 represents, on an enlarged scale, a part of one of the distributers and a portion of the mechanism for reciprocating and elevating the same. Fig. 4 represents a section taken on a line 4 4 of Fig. 3. Fig. 5 represents one of the distributing-cylinders in cross-section. Fig. 6 represents the same in longitudinal section. Fig. 7 represents the hose-carrying reel and the mechanism for rotating the same to take up slack in the hose and also shows a part of the water-supply pipe. Fig. 8 represents a vertical section taken on the line 8 8 of Fig. 7. Fig. 9 represents the reel in cross-section. Fig. 10 is a longitudinal section of the ice-house and illustrates clearly the belt-tensioning mechanism.

In said drawings, where similar numerals refer to corresponding parts, 1 designates the body portion of the distributers, of which there are three shown in the drawings. As said distributers, however, are precisely of the same construction a description of one will suffice for all.

2 designates a pair of pipes which depend divergently from the bottom of the body portion of 1. Said pipes are provided with valves 3, by which the passage of water therethrough is controlled. At their lower ends they are bolted or otherwise rigidly secured to and communicate with the transversely-extending distributing-cylinders 4. Three of said cylinders are employed, preferably, and consequently three sets of diverging pipes 2 will also be employed, as shown.

The cylinders 4 each consist of a lining of zinc or equivalent material 5, and in the vertical plane of the pipes 2 said zinc lining is extended downwardly to form the opposite sides of a spout 6. Externally embracing the zinc lining is a cylindrical sheet of material 7, which will exclude cold and retain within the zinc all of the heat-units of the water, and externally embracing said non-conducting material in turn is a cylinder composed, preferably, of strips of wood 8, secured together in any suitable or preferred manner. The wood cover 8, together with the non-conducting material 7, also embrace the spout extension of the zinc lining nearly to its lower end, and secured to one side of said spout below said wood cover 8 is the longitudinal metallic bar 9, which is provided at intervals with apertures which register with the similar apertures in the spout, and extending through said registering apertures are the bolts 10, engaged at their threaded ends by the wing-nuts 11, whereby said spout may be expanded laterally or contracted that the stream of water issuing therefrom in a continuous sheet may be increased or diminished. Communicating with the body portion 1 a suitable distance from its ends and at opposite sides of its center, for a purpose which will hereinafter appear, are the pipes 12, and coupled to said pipes are the elbows 13. These elbows are in turn connected to a pair of longitudinal pipes 14, united centrally above the body portion 1 by the T-coupling 15. Connected in any suitable manner to the upwardly-projecting arm 16 of this T-coupling is the lower end of the flexible hose 17, and said hose contiguous to said connection is guided by the guide-rollers 18, carried by brackets bolted or otherwise rigidly secured to the contiguous parts of the distributer. The opposite end of the said hose is wound upon a reel 19, which is carried rotatively by the pendent brackets 20. Said brackets are secured to the roof or other convenient point of the ice-house about midway its length. The shaft 21 of the reel is hollow, having one closed end and its opposite and open end swiveled, as at 22, to the discharge end of the horizontal extension 23 of the stand-pipe 24, and which may be connected directly to the water-mains or to any other suitable source of supply. Near one end the hollow shaft is provided with an opening, and communicating therewith is a curve-pipe 25. With the curve pipe the upper end of the hose is permanently connected, as shown clearly in Fig. 9. Mounted rigidly upon the reel-shaft is a drum 26, and secured at one end to and adapted to wind and unwind upon said drum is a cable 27. Said cable extends horizontally from said reel through an opening in one end wall of the ice-house and is guided around a pulley 28. A weight 29 is attached to the opposite end of said cable and is adapted to reciprocate in a vertical plane in guides formed by the inner and outer walls of the ice-house, or in any other suitable or preferred manner. These weights must be sufficiently heavy to rotate the reel and wind thereupon the slack which occurs in the hose when the reciprocating distributer is approaching the middle of the ice-house from either direction and to yield by rising when the reel is operated in the opposite direction by the unwinding of the hose when the distance between said reel and said distributer is increasing.

The distributer is mounted upon a carrier in the form of a sled, consisting principally of a pair of side bars 30, extending parallel with the body portion and secured to the opposite ends of the distributing-cylinders in any suitable or preferred manner, and the runners 31, to which said bars are secured. Depending also from said bars 30, near their opposite ends, are the brackets 32, and journaled loosely between said brackets are the antifriction depression-rollers 33. Projecting upwardly from the extreme ends of said bars are the arms 34, and journaled between the same are the paper-rolls 35. Similar rolls of paper 36 are journaled between said bars vertically below the rolls 35. The rolls 35 each in width slightly exceeds one-third of the distance from one bar 30 to the other and are arranged near the sides of the machine, so as to leave between them an intervening space nearly as wide as one of said rolls. The rolls 36 are of the same width, but are located in the center of the machine, so that their side margins are slightly overlapped by the inner margins of the superposed rolls 35, as shown clearly in Fig. 2. Depending vertically from one end of the body portion 1 is a bracket 37, and pivotally mounted in the same is a dog 38, having an inclined shoulder 39 at its free end. Projecting vertically upward from the opposite end of the body portion 1 is a similar bracket, and said bracket is provided with a similar dog 40, having an inclined shoulder 39 also. Cross-arms 41 of said bracket, at one side of the pivot, and springs 42, bearing upon the dog at the opposite side of the pivot, permit them to have only a limited amount of pivotal movement. Projecting also from the body portion of the distributer are the brackets 43, which are provided with antifriction-rollers 44, for a purpose which will be presently explained.

I will now proceed to describe the mechanism for reciprocating and elevating the distributers.

45 designates vertical standards secured at opposite ends of the ice-house, and 46 rack-bars having downwardly-disposed teeth secured to said bars 44 in such manner as to provide the vertical guide-grooves 47.

48 designates vertically-adjustable carriers, which are provided at their opposite ends with sleeves 49, which loosely embrace the rack-bars and fit snugly in the guide-grooves 47. (See Fig. 3.)

50 designates short shafts, which are journaled in said carriers and carry at their inner end the sprocket-wheels 51, and 52 designates an endless chain, which connects said sprocket-wheels and is guided upon the antifriction-rollers 44, hereinbefore referred to, in order to prevent the sagging of the chain and to hold it in operative position for its work. Said chain at its outer side is provided with a lug 53, which is adapted to come alternately in contact with the teeth of the dogs 38 and 40 in order to move the distributer from one end of the house to the other, as will be hereinafter more particularly referred to. Disposed in the path of and adapted to trip said dogs by coming in contact with their inclined shoulders are the pins 54, which project from the carriers 48.

55 designates a pawl which is pivotally mounted at the upper end of one of the carriers and is held normally in contact with the adjacent rack-bar 46 by a spring 56.

57 designates a pawl pivotally mounted upon the other carrier, and 58 a spring which holds the same normally into engagement with the adjacent rack-bar. The first-named pawl is provided with a depending arm 59, and the last named with a laterally-projecting pin 60. Each carrier is attached to the lower end of a cable 61, which extend vertically upward, and are guided over guide-rollers 62 at the upper end of ice-house and carry at their opposite ends weights 63, the function of which is to automatically elevate the carriers a predetermined distance each time the pawls are thrown out of engagement with the rack-bars. Mounted upon the outer end of one of the shafts 50 is a belt-pulley 64, and connecting the same to an engine or any other suitable motive power, (not shown,) and located at any convenient point, either internally or externally of the building or ice-house, is a belt 65, which drives continuously said sprocket-chain. When in operative position, the distributer extends longitudinally of the ice-house, and the upper and lower strands of the chain 52 are adjacent to and vertically above and below the body portion 1 of the same. The upper portion or strand extends between the pipes 12 and rests upon the upper antifriction-rollers 44, and the lower strand extends between the topmost paper-rolls 35 and rests upon the antifriction-roller 44 below the body portion. Both strands are interposed between said body portion and the dogs 38 and 40, and as said dogs are maintained in substantially a horizontal position it is obvious that the chain cannot be operated without causing the reciprocation of the distributers, owing to the fact that lug 53 will come into engagement first with one dog and then with the other. Supposing the parts to be in operative position (shown in Fig. 1) and the distributer traveling toward the left, it is apparent that when the distributer reaches the limit of its movement in that direction the inclined shoulder of the dog comes in contact with the pin 54 of the opposing carrier and is forced upwardly out of engagement with the lug 53. Immediately this takes place the movement of the distributer is arrested, owing to the fact that it moves at such a slow rate of speed that it acquires practically no momentum, and, furthermore, because the weight 29, connected to the reel, will effectually resist any further movement of the distributer when not caused by a positive force. Immediately such disconnection takes place the continually-moving lug 53 comes in contact with the depending arm 59 and throws the pawl 55 out of engagement with the opposing rack-bar. It remains disconnected only an instant, but sufficiently long for the weight 63 to perform its function, which is to elevate the carrier the distance of one notch upon the rack-bar. The continued movement of the dog 53 next causes it to come in contact with the tooth of the dog 38. Immediately this contact takes place the distributer begins to travel toward the opposite end of the house. When it reaches its limit of movement in this direction, the inclined shoulder 39 of the dog 38 comes in contact with and is tripped by the pin 54 of the opposing carrier and the movement of the distributer is arrested. The continuously-moving lug next comes in contact with the pin 60 of the pawl 57 and trips the same to permit the weight at the corresponding end of the ice-house to elevate its carrier one step or the length of one of the notches of the rack-bar. In practice said distance will be about a quarter of an inch. All succeeding operations are repetitions of those just described.

In carrying out my method of manufacturing ice so as to form the same into a solid or substantially solid block I first place the distributers upon the floor of the ice-house near one end and connect them up properly with the mechanism for reciprocating them and for elevating said mechanism and also connect them up with the flexible pipes or hose 17. The water is then turned on, and as the machine is started on its journey toward the opposite end of the house the water escaping from the spouts of the distributing-cylinders in thin sheets upon the floor immediately freezes in substantially thin layers. An instant or two after it reaches the end of its journey the lug 53 comes into engagement with the other dog and causes it to move in the opposite direction, the runners 31 at this time traveling upon the ice previously formed. With this operation also the water which is being continually fed from the cylinders 4 freezes and forms another layer of ice upon the first, each layer being about a quarter of an inch thick, if the temperature is low enough to freeze that much water with sufficient rapidity. If not, the spouts are adjusted to diminish the quantity of water discharged. With each reciprocation and consequent quarter-inch increase in depth of ice the carriers are elevated alternately by the weights 63, as hereinbefore explained, and consequently the corresponding end of the chain is also elevated so as to maintain the chain in its proper position relative to the distributer, which of course is elevated as the ice increases in depth or thickness. After the distributer has reciprocated a number of times sufficient to form a sheet of ice about twelve inches thick and has reached one end of its journey the operator or operators in charge unwind from the rolls at the end of the distributer which is to form the front end at the next movement sufficient paper to extend from said rolls to the contiguous end of the ice-house. It is then brought down and under the depression-rollers 33, the cylinders 4, and the runners 31 and into direct contact with the surface of the sheet of ice, to which it almost immediately freezes. The machine is then permitted to continue its journey toward the opposite end of the ice-house, and the water escaping floods and freezes in a layer as before upon said paper, which forms a partition between the layer below and the one above. When the end of said journey is reached, the paper is cut and the formation of the ice continued as before until the second layer reaches, say, a depth of twelve inches. The paper is laid again as before, and this operation is repeated throughout the entire manufacturing process, so as to form the ice into layers which reach from end to end and from side to side of the building and are about twelve inches in depth. This is done in order to facilitate the removal of the ice into cakes of requisite and convenient dimensions when ready to be sold to consumers, though it is to be understood that these partitions of paper may be entirely dispensed with, if desired.

I also contemplate as the ice is being manufactured to lay one or more systems or coils of pipes, which shall extend, preferably in a vertical plane or planes, throughout the entire mass of ice and be connected at its upper end in any suitable manner to an air-pump or equivalent machinery and at its lower end be connected by branched conduits to the houses of the consumers. These coils of pipes preferably consist of the superimposed longitudinal pipes 65$^a$ and the semicircular pipes or U-bends 66, which couple the adjacent ends of each pair of pipes together.

In some instances the temperature may be so low that the water, passing in a thin sheet from the distributing-cylinders, would freeze and thus prevent operation of the machinery, if provision were not made to counteract or prevent any such event. To this end I form longitudinal passages 67 in the spout portion 6 of the zinc lining and connect said openings with pipes 68 and pipes 69. The pipes 68 will be connected by hose or flexible pipes to any suitable steam-supply, such as the steam-dome of a boiler, (not shown,) while the pipe 69 may exhaust into the ice-house, or the exhaust may be carried by flexible pipes (not shown) to the outside of the building. At any time when there is danger of the water freezing in the distributers I will counteract such tendency by forcing hot steam through the passages 67.

When it is desired to couple or uncouple the steam-pipes from the distributers, the movement of the latter is temporarily arrested, as will be understood.

It will be understood, of course, that ice can be manufactured with apparatus of this character only when the temperature is sufficiently low, which is very often in territory as far south as latitude 39 or even lower.

While I have described and illustrated particular forms of mechanism and a particular form of distributer, it is to be understood that I do not wish to confine myself to any particular construction or arrangement of parts, and that various changes may be resorted to without departing from the essential spirit or scope or sacrificing any of the advantages of my invention.

As the pulley 64 moves up with the carrier and chain as the ice increases in thickness the belt 65 must of course be kept properly tensioned. To accomplish this, I mount at a convenient point—say on the roof of the building—a bracket 70 and journal thereon the guide-pulleys 71 and 72, engaged by the belt, the shaft of the pulley 72 carrying the belt-pulley 73, driven by belt 74, connected to any suitable motor. (Not shown.) At the opposite end of the building is a bracket 75, carrying a pulley 76, and engaging the same is a cable 77, carrying a weight 78 at one end and attached to a bracket 79 at its opposite end, said bracket carrying a tension-pulley 80, engaging the belt 65, so as to keep the same constantly tensioned under the influence of the said weight. When the ice is formed to the required depth, the carrier-chain and movable connections may be removed until again needed after the house is to be refilled with ice, or the carrier may be braced in its elevated position, so that when the ice is removed it will not rest solely upon the chain. If the carrier and its connected parts are left in the ice-house, then when ice is again to be made the weights 36, 63, and 78, Fig. 10, are pulled upward and the carrier permitted to gravitate down to the floor of the building. Of course the carrier is heavier than said weights, they being elevated to permit the carrier-frames 49 to descend and the reel to freely unwind.

Having thus described the invention, what I claim as new, and desire to secure by Letters Patent, is—

1. In an apparatus for manufacturing ice in a solid mass, a water-distributer, an endless chain for reciprocating the same, and means to automatically and alternately elevate the ends of said chain, and thereby elevate the distributer first at one end of its travel or movement and then at the other, substantially as described.

2. An apparatus for manufacturing ice in a solid mass, comprising a water-distributer, vertically-adjustable carriers therefor, shafts carried thereby, sprocket-wheels upon said shafts, a chain connecting said sprocket-wheels and detachably connected to the distributer, and means to rotate said shafts continuously, substantially as set forth.

3. An apparatus for manufacturing ice, consisting of reciprocatory water-distributers, vertically-adjustable carriers, shafts carried thereby, sprocket-wheels upon said shaft, an endless chain connecting said sprocket-wheels and detachably connected to said distributers, means to rotate continuously the said shafts, and means to automatically and alternately adjust said carriers, substantially as set forth.

4. An apparatus for manufacturing ice consisting of a reciprocatory distributer, vertical rack-bars, vertically-adjustable carriers, shafts journaled therein, sprocket-wheels upon said shafts, a chain connecting said sprocket-wheels and detachably connected to said distributer, spring-actuated pawls pivoted to said carriers, and engaging said rack-bars, and means to trip said pawls from said engagement, means to elevate said carriers when said tripping operation takes place, substantially as set forth.

5. An apparatus for manufacturing ice, comprising a suitable ice-house, guide-standards therein, rack-bars forming a part of said standards, carriers embracing said guide-standards, shafts rotatably carried thereby, sprocket-wheels upon said shafts, a chain connecting said sprocket-wheels and provided with a lug, a reciprocatory distributer adapted to travel back and forth upon the ice as formed, a spring-actuated dog upon said distributer and engaging said lug, means to rotate one of the shafts, and means to trip said dog from engagement with said lug, substantially as, and for the purpose set forth.

6. An apparatus for manufacturing ice, comprising a suitable ice-house, vertical guide-standards therein, carriers adjustably embracing said guides, rack-bars secured to said guides, spring-actuated pawls, pivotally carried by said carriers and engaging said rack-bars, cables suitably guided and attached at their opposite ends to said carriers and to weights, shafts journaled in said carriers, sprocket-wheels mounted thereon, a chain connecting said sprocket-wheels, a distributer detachably connected to said chain, means to rotate continuously one of said shafts, and a lug projecting from said chain to alternately come into contact with said pawls to trip the same, and permit the weights to raise their respective carriers, substantially as set forth.

7. An apparatus for manufacturing ice, comprising a suitable ice-house, a reciprocatory water-distributer, a flexible connection between said water-distributer and a fixed source of supply, and means to alternately pay out and take up said flexible connection as the distributer reciprocates, substantially as set forth.

8. An apparatus for manufacturing ice, comprising a suitable ice-house, a reciprocatory distributer therein, a reel journaled in said ice-house and provided with a hollow shaft, a stand-pipe having a swiveled connection with said hollow shaft, a flexible connection or hose wound upon said reel and connected at its opposite ends to said distributer and to said hollow shaft, and means to wind said flexible connection or hose upon the reel as the distributer approaches the same, substantially as set forth.

9. An apparatus for manufacturing ice, comprising a suitable ice-house, a reciprocatory distributer therein, a reel journaled in said ice-house and provided with a hollow shaft, a stand-pipe having a swiveled connection with said hollow shaft, a drum mounted rigidly upon said hollow shaft, guide-pulleys, a weight suitably guided, and a cable extending over said guide-pulleys and connecting said weight and said drum, substantially as, and for the purpose set forth.

10. In an apparatus for manufacturing ice, a distributer consisting of a body portion, valve-controlled pipes depending therefrom, distributing-cylinders connected to said pipes, and provided with comparatively long and narrow discharge-spouts, bars secured to said cylinders and runners supporting said bars, substantially as set forth.

11. In an apparatus for manufacturing ice, a reciprocatory water-distributer comprising a body portion, supply-pipes, communicating therewith, valve-controlled pipes depending therefrom, distributing-cylinders connected to said pipes, and provided with comparatively long and narrow discharge-spouts, bars secured to said cylinders, and runners supporting said bars, substantially as set forth.

12. In an apparatus for manufacturing ice, a water-distributer comprising a suitable body portion, a water-supply pipe, valve-controlled pipes connected to the body portion, water-distributing cylinders connected to said pipes and provided with comparatively long and narrow spouts, a sled-frame, supporting the distributer, paper-rolls mounted at opposite ends of the same and guide-pulleys, carried by brackets depending from said frame, substantially as set forth.

In testimony whereof I affix my signature in presence of two witnesses.

JOHN H. MARTIN.

Witnesses:
  M. PEARL LOWE,
  G. Y. THORPE.